United States Patent
Karlisch et al.

(10) Patent No.: US 10,263,973 B2
(45) Date of Patent: Apr. 16, 2019

(54) METHOD FOR ACCESSING A SERVICE, CORRESPONDING FIRST DEVICE, SECOND DEVICE AND SYSTEM

(71) Applicant: GEMALTO SA, Meudon (FR)

(72) Inventors: Thierry Karlisch, Gemenos (FR); Siavosh Akhtary, Gemenos (FR); Peter Gullberg, Gemenos (FR)

(73) Assignee: GEMALTO SA, Meudon (FR)

( * ) Notice: Subject to any disclaimer, the term of this patent is extended or adjusted under 35 U.S.C. 154(b) by 0 days.

(21) Appl. No.: 15/520,747

(22) PCT Filed: Oct. 20, 2015

(86) PCT No.: PCT/EP2015/074280
§ 371 (c)(1),
(2) Date: Apr. 20, 2017

(87) PCT Pub. No.: WO2016/062727
PCT Pub. Date: Apr. 28, 2016

(65) Prior Publication Data
US 2017/0310654 A1 Oct. 26, 2017

(30) Foreign Application Priority Data
Oct. 21, 2014 (EP) .................................... 14306670

(51) Int. Cl.
*H04L 29/06* (2006.01)
*G06Q 20/10* (2012.01)
(Continued)

(52) U.S. Cl.
CPC ............ *H04L 63/08* (2013.01); *G06K 7/1413* (2013.01); *G06K 7/1417* (2013.01);
(Continued)

(58) Field of Classification Search
CPC ..................................................... H04L 63/08
See application file for complete search history.

(56) References Cited

U.S. PATENT DOCUMENTS 8,136,722 B2 * 3/2012 Cornillon ............... G06Q 20/00
235/375
8,433,914 B1 4/2013 Philpott
(Continued)

FOREIGN PATENT DOCUMENTS

CN 102075547 A 5/2011
WO WO-2005109360 A1 * 11/2005 ............. G06Q 20/12

OTHER PUBLICATIONS

International Search Report (PCT/ISA/210) dated Jan. 1, 2016, by the European Patent Office as the International Searching Authority for International Application No. PCT/EP2015/074280.
(Continued)

*Primary Examiner* — Shawnchoy Rahman
(74) *Attorney, Agent, or Firm* — Buchanan Ingersoll & Rooney PC

(57) ABSTRACT

A first device generates a first signature by using complete transaction data received from a second device, a first algorithm and a first key, modifies at least one character from the complete transaction data and gets partial transaction data, and sends to the second device the partial transaction data. The second device requests a user to modify the partial transaction data by providing at least one character, as complementary data to the partial transaction data, gets, as request response from a user, at least one character to modify the partial transaction data, a corresponding result being proposed modified transaction data, generates a second signature by using the proposed modified transaction data, the first algorithm and the first key, and sends to the first device the second signature. Only if the second signa-
(Continued)

Figure 1:
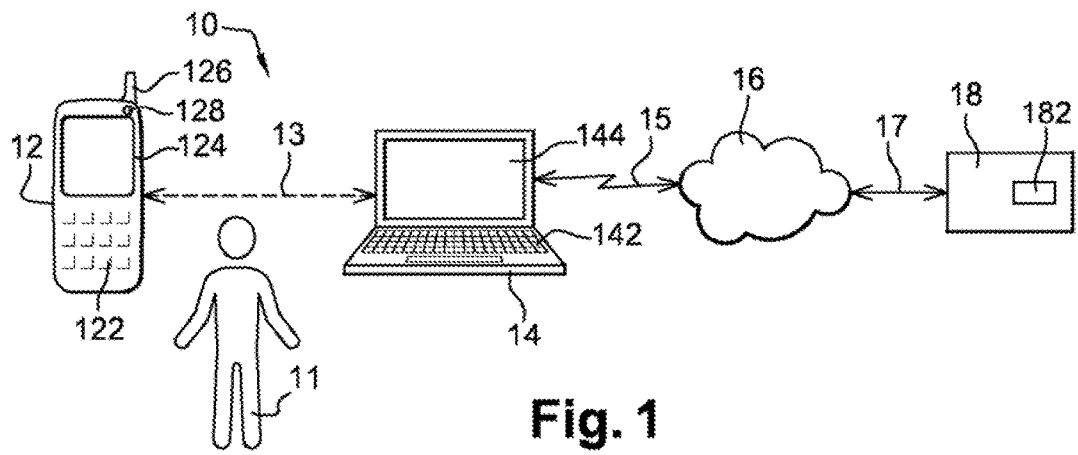

ture does match the first signature, then the first device authorizes to carry out a corresponding transaction.

10 Claims, 1 Drawing Sheet

(51) Int. Cl.
    *G06Q 20/40*         (2012.01)
    *H04W 12/06*       (2009.01)
    *G06K 7/14*          (2006.01)
    *H04L 9/06*          (2006.01)
    *H04L 9/32*          (2006.01)

(52) U.S. Cl.
    CPC ......... *G06Q 20/108* (2013.01); *G06Q 20/401* (2013.01); *G06Q 20/4018* (2013.01); *H04L 9/0643* (2013.01); *H04L 9/3247* (2013.01); *H04L 63/18* (2013.01); *H04W 12/06* (2013.01); *H04L 9/3249* (2013.01)

(56) References Cited

U.S. PATENT DOCUMENTS

| | | | | |
|---|---|---|---|---|
| 8,752,125 | B2 | 6/2014 | Baharis et al. | |
| 9,780,603 | B2* | 10/2017 | Girard | G06Q 10/06 |
| 9,881,434 | B2* | 1/2018 | Biton | G06K 19/07703 |
| 2003/0144965 | A1* | 7/2003 | Prasad | G06Q 20/382 |
| | | | | 705/65 |
| 2004/0186912 | A1* | 9/2004 | Harlow | G06Q 20/40 |
| | | | | 709/237 |
| 2009/0065571 | A1* | 3/2009 | Jain | G06K 19/07739 |
| | | | | 235/379 |
| 2011/0265149 | A1 | 10/2011 | Ganesan | |
| 2013/0334308 | A1* | 12/2013 | Priebatsch | G06Q 90/00 |
| | | | | 235/383 |

OTHER PUBLICATIONS

Written Opinion (PCT/ISA/237) dated Jan. 1, 2016, by the European Patent Office as the International Searching Authority for International Application No. PCT/EP2015/074280.
Japanese Office Action dated Apr. 3, 2018 issued by the Japanese Office Action in corresponding Japanese Patent Application No. 2017-521226 with English Language Translation (11 Pages).

* cited by examiner

METHOD FOR ACCESSING A SERVICE, CORRESPONDING FIRST DEVICE, SECOND DEVICE AND SYSTEM

FIELD OF THE INVENTION

The invention relates, in a general manner, to a method for accessing a service.

Furthermore, the invention pertains to a first device, like e.g. a server, or accessing a service.

Moreover, the invention also relates to a second device for accessing a service.

The present invention is notably applicable to a mobile radio-communication field in which the second device is a mobile terminal, like a mobile (tele)phone, or a Secure Element, like e.g. a Subscriber Identity Module type card or an embedded chip, that cooperates with a mobile terminal.

Finally, the invention concerns a system for accessing a service that includes a first device and a second device which is connected or coupled to the first device.

STATE OF THE ART

A known solution for accessing a service is based on a use of a remote (web) (bank) server, a smart card reader, a hardware token or a mobile device and a Personal Computer (or PC) that is connected over Internet to the server, so as to carry out a (banking) transaction. Firstly, a PC user enters, through a PC browser, into a bank server page, transaction information (amount, account, date, and so on). The PC sends to the server the entered transaction information, as transaction data. Then, the server sends back to the PC data to be signed by the mobile device. The user reads the data on the mobile device and compares it to the data displayed by the PC browser. When validated by the user, the mobile device receives the data and generates a cryptogram depending on the transaction data and user data. The user enters, through the PC browser, into a bank server page, the cryptogram, as transaction signature. The PC browser sends the transaction signature to a signature verification server. The signature verification server verifies whether the cryptogram is the expected one and, when successful, the server authorizes the considered transaction.

However, a malicious application supported by the PC may alter the transaction data and the user may thus validate a fake transaction.

There is therefore a need to access securely the service while reducing a risk of altering the transaction data notably by a malicious application supported by the PC.

SUMMARY OF THE INVENTION

The invention proposes a solution for satisfying the just herein above specified need by furnishing a method for accessing a service.

According to the invention, the method comprises the following steps. a) A first device receives from a second device data relating to a transaction, as complete transaction data. b) The first device generates a first signature by using the complete transaction data, a first algorithm and a first key. c) The first device modifies at least one character from the complete transaction data and gets partial transaction data. d) The first device sends to the second device the partial transaction data. e) The second device requests a user to modify the partial transaction data by providing at least one character, as complementary data to the partial transaction data. f) The second device gets, as request response from a user, at least one character to modify the partial transaction data, a corresponding result being proposed modified transaction data. g) The second device generates a second signature by using the proposed modified transaction data, the first algorithm and the first key. h) The second device sends to the first device the second signature. i) The first device verifies whether the second signature does or does not match the first signature. j) Only if the second signature does match the first signature, then the first device authorizes to carry out a corresponding transaction.

The principle of the invention consists in submitting, from a first device to a second device, only a part of (right) transaction data to be presented to a user that has to correct and to modify the submitted partial transaction data, prior to signing the (resulting) modified transaction data and to send back a corresponding signature to be checked by the first device.

Within the present description, partial transaction data means that a user has to inform one or several characters which are not present at all and/or wrongly proposed, namely that have, each, to be provided by the user, i.e. added, replaced and/or modified by the right character that is known to the user.

Since the provided transaction data is modified and not (completely) correct (or right), it forces a user to engage in the process by reading the provided transaction data, to identify the missing and/or modified transaction data and to specify correctly the complementary part of the transaction data.

The proposed solution obliges the user to participate and to be fully concentrated on the way she or he modifies the provided transaction data, so as to access the considered service.

Thus, a malicious application supported at the second device side is not able to modify or alter the concerned transaction data.

Contrary to the herein above described known solution, thanks to a real involvement of the user at the client side, the invention allows securing such transaction with respect to the known solution.

It is to be noted that the transaction data to be modified may be provided either directly or indirectly (namely through one (or several) intermediary device(s)) from the second device to a user.

According to a further aspect, the invention is a first device for accessing a service.

According to the invention, the first device is configured to receive data relating to a transaction, as complete transaction data, to generate a first signature by using the complete transaction data, a first algorithm and a first key, to modify at least one character from the complete transaction data and to get partial transaction data, to send the partial transaction data, to receive a second signature, to verify whether the second signature does or does not match the first signature and to authorize to carry out a corresponding transaction only if the second signature does match the first signature.

As first device, it may be a local or remote server.

According to still a further aspect, the invention is a second device for accessing a service.

According to the invention, the second device configured to send data relating to a transaction, as complete transaction data, to receive partial transaction data, to request a user to modify the partial transaction data by providing at least one character, as complementary data to the partial transaction data, to get, as request response from the user, at least one character to modify the partial transaction data, a corresponding result being proposed modified transaction data, to generate a second signature by using the proposed modified transaction data, a first algorithm and a first key, and to send the second signature.

As second device, it may be a user terminal, a Secure Element (or SE) and/or any other device connected to and/or equipped with means for getting, from a user, completed transaction data and means for generating a (digital) signature relating to the (resulting) complete transaction data.

As to the user terminal, it may be constituted by a mobile (tele)phone, a Personal Digital Assistant (or PDA), a palmtop computer, a Personal Computer (or PC), a desktop computer, a laptop computer, a portable TeleVision (or TV), a netbook, a tablet computer, a game console, a portable PC or any other device connected to and/or equipped with means for getting, from a user, completed transaction data and means for generating a (digital) signature relating to the complete transaction data.

According, to still a further aspect, the invention is a system for accessing a service.

According to the invention, the system comprises such a first device and at least one such a second device. The second device is connected or coupled to the first device.

BRIEF DESCRIPTION OF HE DRAWINGS

Figure 2:
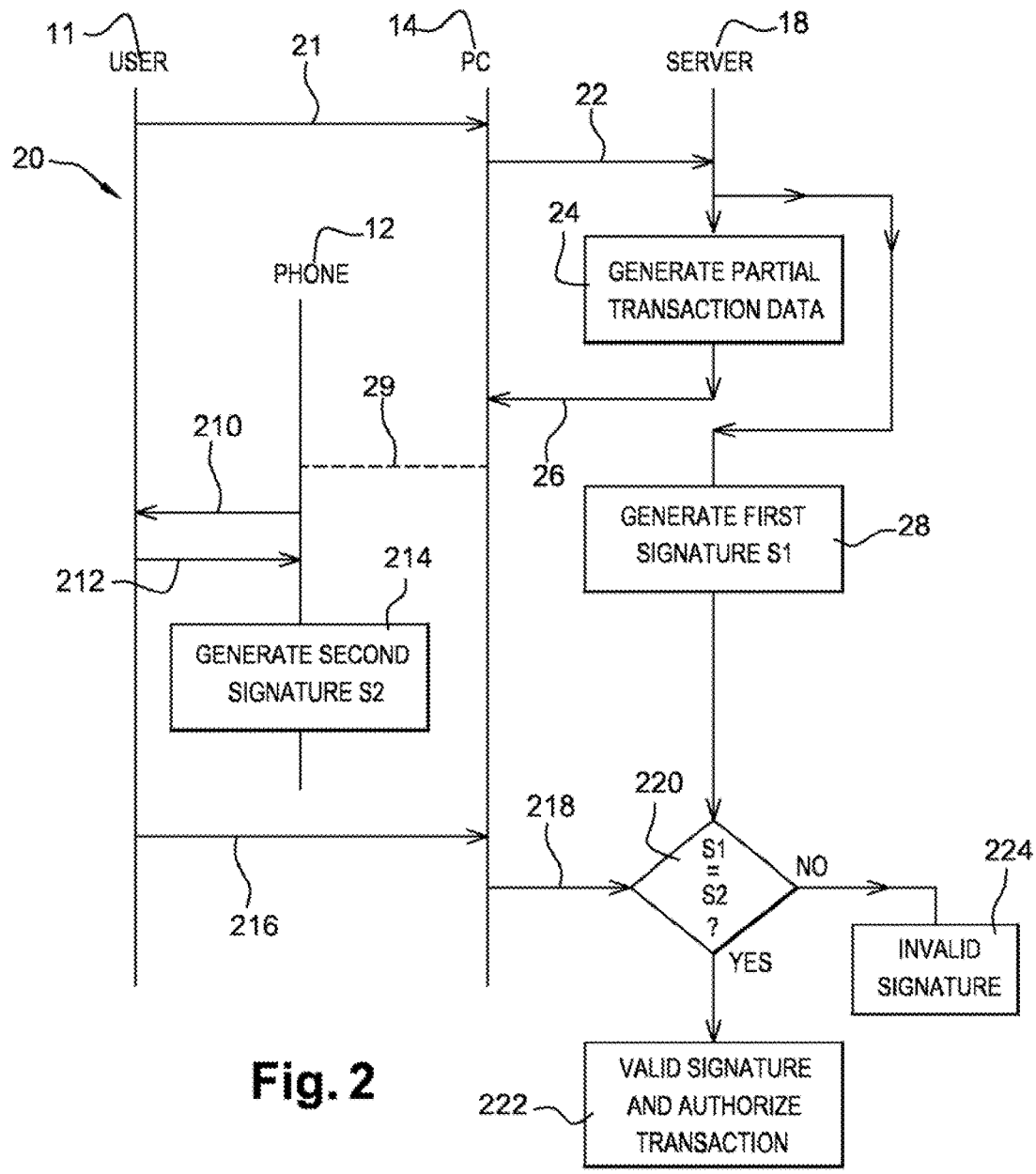

Additional features and advantages of the invention will appear more clearly when reading a detailed description of one embodiment of the invention, given as an indicative and non-limitative example, in conjunction with the following drawings:

FIG. 1 illustrates a simplified diagram of one embodiment of a system including a remote server, a PC and a user terminal, the server being adapted to provide, at a client side, a user with modified transaction data to be provided correctly or rightly by the user, according to the invention; and FIG. 2 represents a simplified message flow of one embodiment of a method implemented notably by the phone and the server of FIG. 1, so that the user provides the modified (right) transaction data, the user terminal signs the modified transaction data and provides the server with the signed transaction data and the server, once it has successfully checked the received data, allows the user to access a requested service.

DETAILED DESCRIPTION

Herein under is considered a case in which the invention method for accessing a service is implemented by a distant server, as a first device, in cooperation with a user terminal, as a stand-alone second device, over a PC, as a third and intermediary device.

However, the invention method for accessing a service may be implemented by, instead of a phone, as user terminal, an SE equipped with or connected to a Man Machine Interface (or MMI) to cooperate with the user. In other words, the SE does not cooperate with any user terminal, so as to let the user modify the received transaction data, sign the (modified) transaction and send to the server the signed transaction. According to such an embodiment (not represented), the SE is adapted to carry out the functions carried out by the phone, as user terminal, and that are described infra.

Within the present description, the SE is a smart object that protects physically access to data stored within the SE and that is intended to communicate with the outside world. The SE is any electronic medium that may have different form factors. The SE may be constituted, among others, by a smart card or a chip incorporated within a Printed Circuit Board (or PCB). As a smart card, it may be a Subscriber Identity Module (or SIM) type smart card, a (micro) Secure Digital (or SD) type card, a micro-SD type card or a Multi-Media type Card (or MMC) or any card of another format. Alternately, the SE is a smart dangle of the USB (acronym, for "Universal Serial Bus") type.

According, to another embodiment (not represented), the second device cooperates with an SE. According to such an embodiment (not represented), the SE is adapted to carry out at least a signature generation function that is carried out by the user terminal, as second device, and that is described infra. Moreover, the SE may be equipped with a secure display screen that displays the received (modified) partial transaction data and the transaction data, once rightly modified by the SE user.

FIG. 1 shows a system 10 for accessing a service.

The system 10 comprises a mobile phone 12, as portable device and user terminal, a PC 14 and a remote server 18.

For the sake of clarity and conciseness, the mobile phone 12 and the remote server 18 are termed hereinafter the phone 12 and the server 18 respectively.

The phone 12 and the PC 14 are used by a user 11 to buy on-line one (or several) product(s) and/or service(s) from one (or several) (web) server(s) 18.

The PC 14 may be used between the phone 12 and the server 18.

According to the presented embodiment, the PC 14 is an additional device that is used at the client side and that constitutes an intermediary device in a communication between the phone 12 and the server 18.

The phone 12, as user terminal, may be any terminal device including means for processing data, being connected to or comprising means for interfacing with a user, as MMI and being connected to or comprising means (not represented) for storing data.

The phone 12 comprises a keyboard 122, a display screen 124, as phone MMI.

Alternatively, instead of a separate keyboard, the display screen integrates a (virtual) touch sensitive keyboard.

The phone MMI may be used for presenting to the user 11 notably modified and partial (right) transaction data and for modifying, by the user 11, notably the partial transaction data, while removing, replacing and/or adding one or several characters.

Instead of the phone MMI, an external secure MMI (not represented) that is incorporated within an SE (not represented) connected or coupled, to the phone 12 may be used.

Irrespective of whether the MMI is incorporated or not within the phone 12, the MMI allows interacting with the user 11, so as to inform the user 11 and to be informed by her/him.

The phone 12, as user terminal, includes preferably a wireless antenna 126, so as to connect to a mobile communication network(s) (not represented).

Within the present description, the adjective "wireless" before the word "antenna" means that the antenna operates by using one or several Long Range (or LR) Radio-Frequency (or RF) links that may be more or less long. The LR RF(ies) may be fixed at several hundreds of MHz, for instance around 850, 900, 1800 and/or 1900 MHz, 2 GHz and/or more.

The mobile radio-communication network(s) may be constituted by a Global System for Mobile Communications (or GSM), a General Packet Radio Service (or GPRS), an EDGE (acronym for "Enhanced Data Rates for GSM Evolution"), a Universal Mobile Telecommunications System (or UMTS), a Code Division Multiple Access (or COMA) and/or a Long Term Evolution (or LTE) type network(s).

Instead of a mobile radio-communication network(s), the phone 12 may access the server 18, through a network access point (not represented), via a contact-less link, one over an Internet network.

The phone 12 may be provided with a camera 128.

The camera 128 may be used for capturing data displayed on a PC display screen. The displayed data may be a code, like e.g., a Quick Response (or QR) code, a barcode, a bocode or any other 2D or 3D code, relating to transaction data that may be partially right. Once captured, the phone 12 decodes a code relating to transaction data, so as to get modified transaction data that remains to be rightly modified by the user 11.

Alternately, instead of a camera, the phone 12 is provided with a contact, contact-less, a wireless, an audio, an optical, an ultrasonic and/or any other communication interface. The phone 12 may thus be connected, through one or several communication interface, to the PC 14.

According to another alternative embodiment, the user 11 enters or types, by using the phone 12 MMI (or an MMI connected, or coupled to the phone 12), one or several characters relating to partial(ly) (right) transaction data. According to a particular embodiment, the partial transaction data is received by the PC 14, so as to get, at the phone 12, modified transaction data that remains to be rightly modified by the user 11.

Instead of an ubiquitous terminal like the phone, the portable device may be a specific terminal (or SE) dedicated to carrying out a transaction(s) with one (or several) server(s) 18 by letting intervene the user 11 to modify partial transaction data provided by the server 18.

The phone 12 includes preferably one (or several) microprocessor(s), as data processing means (not represented), one (or several) memory(ies), as data storing means (not represented) and one (or several) Input/Output (or I/O) interface(s) (not represented) which are internally linked together through a data and control bus.

The phone memory stores data.

Alternately, instead of an internal phone memory, an SE (not represented) stores data within an SE memory.

As data, it may contain:
a (user) name, a surname, a birth date, a citizenship and/or other data relating to the phone user 11;
an International Mobile Subscriber Identity (or IMSI) or the like, as an identifier relating to the phone 12;
data relating to a transaction, like e.g. user data, a reference number, an identifier relating to a bank card, an expiry date, a Card Verification Code (or CVV), a maximum transaction amount to be debited from the user 11 bank account, a transaction currency, a transaction amount, a bank account number relating to a payer, a bank account number relating to a payee, an operation type, a payment date and/or other data;
a generated password or One Time Password (or OTP), as data relating to an authentication of the phone 12 and possibly the user 11;
a key(s) including a private key, as an asymmetric and secret key, for signing data and possibly a public key shared with the server 18 for verifying a signature originating from the phone 12 and/or a key, as a symmetric key shared with the server 18 for signing data and verifying a signature originating from the phone 12;
a signature algorithm;
a Uniform Resource Identifier (or URI) or a Uniform Resource Locator (or URL) of the server 18 to be addressed;
an Internet Protocol (or IP) address of the server 18 to be addressed; and/or
one (or several) application(s).

The transaction data is a series of characters, as units of information. A character may be a digit, a symbol, a letter, a sign a musical note or any other unit (or item) of information.

Partially right transaction data, termed infra partial transaction data, are to be captured (i.e. received or got), over possibly the PC 14 and/or the user 11, from the server 18.

Missing and/or wrongly proposed transaction data, as partial transaction data may be marked in a particular way, such as with a predefined character, like e.g. a star "*". Alternately missing and/or wrongly proposed transaction data, as partial transaction data, is marked with an highlight of a concerned corresponding space, like e.g. a box, where a transaction data item or unit is missing or wrongly proposed within partial transaction data to be captured by the signer.

Partial transaction data has to be modified by the user 11 with one or several characters, as complementary part of the partial transaction data to compose full or complete) right transaction data that is needed to perform a transaction.

The phone memory may also store user data, like e.g. a User IDentifier (or UID) and/or a user password. The user data may allow identifying and authenticating a user of the phone 12 to an entity, like e.g. the server 18.

The signature algorithm may be constituted by a Rivest Shamir Adleman (or RSA), a Data Encryption Standard (or DES), a 3DES, a Hash Message Authentication Code (or HMAC) Secure Hash Algorithm (or SHA) 1, an HMAC SHA 256, an HMAC SHA 512, any HMAC SHA type algorithm or any other symmetric or asymmetric key signature algorithm.

The key, either a symmetric key or air asymmetric key, that is used for verifying a signature to be issued by the phone 12 is shared with the server 18.

The phone memory may store a Uniform Resource Identifier (or URI), like a Uniform Resource Locator (or URL), a call phone number, a video-conference call phone number, an email address, an Internet Protocol (or IP) type address and/or the like, as an identifier(s) relating to an intended addressee of a transaction request, like e.g. the server 18.

The phone memory stores preferably a private encryption key and a corresponding public encryption key. The public encryption key may be used, by the server 18, for encrypting data to be sent to the phone 12, so as to protect data thus transmitted in an encrypted manner.

The phone memory stores preferably a public encryption key relating to the server 18. The phone 12 may use the server public encryption key for encrypting data to be sent to the server 18.

Alternately, the phone memory stores a symmetric encryption key shared with the server 18 to be used for encrypting data to be sent to the server 18 and decrypting data received from the server 18.

As application(s) supported by the phone 12, there is a target application allowing the phone 12 to send data, such as the transaction data, accompanied with a corresponding signature. Thus, the phone 12, when authenticated as data sender, is allowed by the receiving entity, like e.g., the server 18, to carry out a transaction (if there is(are) no other condition(s) to be satisfied at the server 18 side). Otherwise, the phone 12 may be forbidden by the receiving entity to carry out any transaction.

As target application, it includes an application for generating a signature, like e.g. an applet termed Europay Mastercard Visa (or EMV) Chip Authentication Program (or CAP) or an Open authentication (or OATH) Challenge Response Algorithm (or OCRA). Such a signature generation application allows issuing a signature, so as to authenticate the phone 12, as a sender of data.

As target application, it includes an application for rightly completing partial transaction data.

The target application may modify automatically one (or several) wrongly proposed and/or missing character(s) relating to the transaction data without needing to involve the user 11. To modify automatically one (or several) right character(s), the target application is configured to get right transaction data that is accessible, i.e. stored within either the phone memory or a memory of an entity, like e.g. a token or an SE, that is coupled or connected to the phone 12.

If there is a character(s) to be informed and relating to transaction data that is not stored within the phone 12, then the target application allows requesting, through the phone 12 MMI (or an external MMI), to the user 11 a right character(s), so as to get modified and complete transaction data.

The phone microprocessor processes data originating from the phone memory and/or an external entity(ies), like e.g. the PC 14 and/or the server 18.

The phone microprocessor executes any supported application, like notably the target application and one (or several) security application(s), as security function(s), in order to protect access to user information managed through or by the phone 12.

The security application(s) include(s) a signature generation process. The signature generation process uses preferentially a signature generation algorithm, like e.g., an EMV CAP, to generate data for authenticating the phone 12, as data sender.

The security functions may include a user authentication process. The user authentication process may be used before reading sensitive data, such as notably transaction data that is accessible from the phone 12 (i.e. stored within the phone 12 or another entity connected to the phone 12).

The security functions may include an encryption decryption process to be used before sending to/after receiving data, so as to protect access to data thus exchanged between the phone 12 and an interlocutor entity, like e.g., the server 18.

The PC 14 includes a microprocessor(s) (not represented), as data processing means, one or several memories (not represented), as data storing means, and one or several I/O interfaces (not represented) which are internally linked together through a data and control bus.

The PC 14 includes preferably a keyboard 142 and a display screen 144, as PC MMI.

According to a particular embodiment (not represented), instead of two separate functional elements as MMI, the PC 14 includes a touch sensitive display screen that displays a virtual keyboard, when activated.

The PC 14 supports a browser allowing the user 11 to interact with the server 18.

The PC 14 is connected, via a bi-directional ink(s) 15, through a network access point (not represented), over an Internet or Intranet type network 16, to the server 18.

The PC I/O interface with the network 16 may include a contact interface, so as to communicate with the server 18.

Alternatively, the PC I/O interface with the network 16 includes a contact-less interface. The PC 14 cooperates, for instance, over a Short Range (or SR) RF link(s), with the network access point while being relatively close to each other. An SR RF(s) may be fixed from around 2.4 GHz to around 10 GHz (for Ultra WideBand (or UWB), e.g. IEEE 802.15.4a), at 2.4-2.5 GHz with a range of about 10 m to 100 m (for Zigbee (e.g. IEEE 802.15.4), Wifi and Bluetooth or Bluetooth Low Energy (IEEE 802.15.1)) and/or other RF value(s) allowing to communicate with an SR distance (up to 800 m). The contact-less interface may include a WLAN (acronym, for "Wireless Local Area Network"), a Bluetooth, a Bluetooth Low Energy, a Wifi, a Metropolitan Area Network (or MAN), a Worldwide Interoperability for Microwave Access (or WiMax) and/or a Wireless BROadband (or WIBRO) radio-communication type technology(ies).

The PC memory stores preferably a URI, like e.g. an URL, a call phone number, a video-conference call phone number, an email address, an Internet Protocol (or IP) type address and/or the like, as an identifier(s) relating to an intended addressee of a transaction request, like e.g. the server 18.

The server 18 is connected, for instance, through a cable, through a bi-directional link 17, to the Internet or Intranet network 16.

The server 18 that is to be addressed as addressee of a request for accessing a service is identified within data retrieved from the PC 14 (and/or the phone 12).

Alternately, the phone user may be requested to enter, through the PC MMI, a server identifier(s).

The server may be accessible through a mobile radio-communication network(s) (not represented).

The server 18 plays a role of a provider of partially right transaction data and a controller of a transaction, notably after a verification of a signature relating to modified and complete (right) transaction data and originating from a client device, like e.g. the phone 12.

The server 18 may be operated by a bank operator, service provider or on its behalf.

The server 18 is integrated within an entity of a back-end system.

The server 18 is hosted by a computer.

According to a preferred embodiment, the server 18 is hosted by, coupled or connected to a Hardware Security Module (or HSM) (not represented) that stores, manages (digital) keys and provides a crypto-processing service(s) in a secure manner.

The server 18 includes a microprocessor(s) (not represented), as data processing means.

The server data processing means executes preferably security ions in order to protect access to information managed through or by the server 18.

The security functions include preferentially an encryption/decryption process to be used before sending data to outside/after receiving data from outside. To encrypt data to be sent, the server 18 uses a key that is stored within the server memory and an encryption algorithm. To decrypt data to be received, the server 18 uses a key that is stored within the server memory (or the HSM or the like) and a decryption algorithm.

The server 18 includes a memory 182, as data storing means.

Alternatively, instead of an internal memory, the server 18 is connected to an internal memory.

The server memory 182 stores a database.

The database includes a set of one or several client, device identifiers that are, each, associated with a signature generation key and a signature generation algorithm that are previously shared with the concerned client device.

The server memory 182 (or the HSM) stores preferably a private key and a corresponding public key to be used by any client device, like e.g. the phone 12, for encrypting data to be sent to the server 18 from any device, like e.g. the PC 14, associated with the client device managed by the server 18.

Alternatively, the server memory 182 (or the HSM) stores a shared key to be used by any client device, like e.g. the phone 12, and the server 18 for encrypting data to be sent to the server 18 and to the device respectively.

The server memory 182 stores preferably rules for accessing the service managed by the server 18.

The rules for accessing the service may encompass, for each client device, a user profile(s) that is(are) eligible for accessing the service, a predetermined minimum amount of the bank account number, a predefined minimum age and/or (an)other access condition(s).

The rules for accessing the service are taken into account so as to forbid or authorize access to the concerned service.

The server memory 182 stores a transaction modification application, as an invention application that is supported by the server 18.

To modify complete (right) transaction data, the server 18 may:
  remove one or several character(s) of the complete transaction data;
  replace one or several right character(s) of the complete transaction data individually by, another wrong character, like e.g. a random character; and/or
  add one or several character(s) to the series of characters included in complete transaction data.

The server 18 uses a received client device identifier, so as to retrieve a corresponding key and signature generation algorithm that are associated with the client device and that are used by the server interlocutor to generate a signature to be also received by the server 18.

The identifier(s) may include a client certificate, as an identifier that is independent from any mobile network operator.

Alternately or additionally, the identifier(s) may include an International Mobile Subscriber Identity (or IMSI), a user identifier, a bank account number and/or a Mobile Station International Subscriber Directory Number (or MSISDN).

The identifier(s) may be provided by the client device itself, a device that is locally connected or coupled to the client device and/or an entity(ies) relating or connected to a communication network that is(are) used for transmitting data to the server 18.

The server memory 182 stores a signature generation application.

The server 18 generates a (digital) signature relating to complete transaction data, as first signature S1 and reference to be matched, by using the complete (right) transaction data, the signature generation algorithm and the signature generation key.

The server 18 is configured to receive a proposed signature that may be accompanied with proposed modified and complete (right) transaction data.

Once the server 18 receives a proposed signature that originates from a client device, like e.g., the phone 12, the server 18 verifies whether the proposed signature does or does not match the first signature S1, as expected and reference signature.

The server 18 thus compares the proposed signature to the first signature S1.

If the proposed signature does not match the expected signature, then the server 18 fails to verify the signature and does not authorize to carry out a corresponding transaction. After each signature verification failure, the server 18 may increment a ratification counter that is originally set to an initial value, like e.g. zero, so as to authorize a client device to perform one or several additional attempts. Prior to reaching a predetermined Threshold (or T), the server 18 may undertake one or several actions for implementing a risk management mechanism. Once the counter reaches the predetermined T, after a predetermined number of authorized attempts that has not to be exceeded, the server 18 aborts the initiated transaction by e.g. not transmitting any transaction authorization.

Alternately, instead of incrementing ratification counter, the server 18 countdowns a counter that has been initially set to a predetermined original value, like e.g. a predetermined number of authorized attempts that has not to be exceeded to get a (valid) signature relating to modified and complete (right) transaction data.

Otherwise, i.e. if the proposed signature does match the expected signature S1, the server 18 succeeds in verifying the signature relating to modified and complete (right) transaction data and authorizes to carry out the initiated transaction. Once the signature is successfully verified, the server 18 sends subsequently one or several messages relating to a success of the transaction to the client device, like e.g. the phone 12, another associated device like, e.g. the PC 14, and/or another server (not represented).

FIG. 2 shows an example of a message flow 20 that involves the user 11, the phone 12, the PC 14 and the server 18.

It is assumed that the phone camera 128 used, at the client side, for getting partial transaction data originating from the server 18.

Firstly, the PC user 11 accesses, by using the PC 14 MMI, through the PC 14 browser and a (web) page, the server 18 (or another server (not represented)), so as to initiate a transaction.

Then, the user 11 provide 21, by using the PC 14 MMI, through the PC 14 browser and the same or another page, at least part of complete transaction data, so as to get complete transaction data. The user 11 may provide e.g. transaction data relating to her/his bank account number, as bank account number relating to a payer.

The server 18 (or another server (not represented)) may provide, through the downloaded page(s), part of the complete transaction data, like e.g. a bank account number relating to a payee.

The PC browser aggregates the transaction data relating to a payer, the transaction data relating to a payee and the transaction data relating to a product(s) and or a service(s) to be thus accessed by the user 11.

Once completed by the user 11, the PC 14, and more exactly the PC browser, sends 22 to the server 18 the complete (right) transaction data.

In a preferred embodiment, the PC 14 further sends to the server 1 phone number, as MSISDN and an identifier relating to the user phone 12.

For instance, the complete (right) transaction data is e.g. the following:

| | |
|---|---|
| Intl Transfer: | ITR |
| Date: | 16/10/2014 |
| From account: | FR3447821067430950117H485108 |

| | |
|---|---|
| To account: | MT42890042312976407152440613187 |
| Amount: | 123456,00 EUR |

Wherein the following data fields:

"Intl Transfer" represents a type of transaction operation;

"Date" is a date of a product purchase;

"From account" represents a bank account relating to a payer, namely the user 11;

"To account" denotes a bank account relating to a payee, namely the server 18 or another server (not represented); and "Amount" represents a transaction amount.

The server 18 modifies 24 the complete transaction data.

It is assumed that the server 18 modifies the complete transaction data by removing some predefined characters and adding a predetermined character, like a dash "-", at each location where there is a lacking or missing character. The dash is used for prompting the user to modify, for instance, i.e. to fill (or complete) it in the described embodiment, with the right (expected) character.

Once the server 18 has modified the complete transaction data, a corresponding result is partial transaction data. The partial transaction data is e.g. the following:

| | |
|---|---|
| Intl Transfer: | --- |
| Date: | 16/10/2014 |
| From account: | FR3447821067430950117H----08 |
| To account: | MT42890042312976407152440061---- |
| Amount: | ---456,00 EUR |

According to a particular embodiment (not represented), the server 1 generates a QR code based on the resulting partial transaction data.

The server 18 sends 26 to the PC 14 data relating to the resulting partial transaction data, like e.g. the generated QR code.

Alternatively, the server 18 sends to the PC 14 the resulting partial transaction data in clear data.

The PC 14 displays, through the PC browser, the QR code, as data relating to the resulting partial transaction data.

Alternately (not represented), the server 18 sends directly to the phone 12 the QR code.

According to another embodiment (not represented), the server 18 sends to the phone 12 the resulting partial transaction data either in clear data or in an encrypted manner.

The server 18 generates 28 (and stores) a signature S1 relating to the complete (right) transaction data, as expected and first signature, by using the (received) complete transaction data, a signature algorithm and a key. The signature algorithm and the key are shared with the phone 12. The first signature S1 is a first cryptogram.

The user 11 scans, by using her/his phone 12, the QR code, so as to get 29 the received data.

The phone 12 decodes the QR code and further decrypts possibly the decoded (encoded) data.

The phone 12 gets the partial transaction data.

The phone 12 requests 210, through the phone MMI, the user 11 to modify, for instance, i.e. to complete in the described embodiment, the partial transaction data.

The user 11 reads the partial transaction data and retrieves each lacking character which the user 11 knows.

The user 11 modifies 212, through the phone MMI, the partial transaction, by e.g. adding each missing character which may be represented by using a predetermined character type, like e.g. bold character.

| | |
|---|---|
| Intl Transfer: | ITR |
| Date: | 16/10/2014 |
| From account: | FR3447821067430950117H485108 |
| To account: | MT42890042312976407152440613187 |
| Amount: | 123456,00 EUR |

Thus, the user modification of the partial transaction data allows getting proposed modified and complete transaction data.

Then, the phone 12 generates 214 a second signature S2 relating to the proposed modified transaction data by using the proposed modified and complete transaction data, a shared signature algorithm and a shared key. The second signature S2 is a second cryptogram.

Once the second signature S2 is generated, the phone 12 presents through the phone MMI (or an external MMI), to the user the second signature S2.

Optionally, before sending the second signature S2, the phone 12 encrypts the second signature S2, by using either a public key relating to the server 18 or a shared key stored at the phone side and at the server side.

The user 11 enters or types 216, through the PC MMI, the second signature S2.

Then, the PC 14 sends 218 to the server 18 the second signature S2.

Alternately, instead of the PC 14 the phone 12 sends directly to the server 18 a message (not represented), like e.g. a Short Message Service (or SMS), one Multimedia Message Service (or MMS) and/or an email, that comprises the second signature S2 possibly in an encrypted manner and an identifier of the phone 12, like e.g. an MSISDN. The server 18 is thus able to associate the received second signature S2 with the initiated (pending) transaction session.

Optionally, the server 18 carries out a data decryption on the encrypted second signature by using a private key relating to the server 18 or the shared key stored at the phone side and at the server side.

Once the server 18 receives the second signature S2, the server 18 verifies 220 whether the second signature S2 does or does not match the first signature S1.

Only if the second signature S2 does match the first signature S1, then the server 18 authorizes 222 the requested transaction.

Otherwise, i.e. if the second signature S2 does not match the first signature the received signature is not valid and the server 18 either forbids the requested transaction or implements a risk management mechanism.

The invention solution is secure since the user 11 has to really read the proposed partial transaction data prior to modifying it and at least the phone 12 is authenticated, by the server 18, as sender of the proposed modified transaction data.

The invention claimed is:

1. A method for accessing a service, the method comprising:
    a) a first device receives from a second device data relating to a transaction, as complete transaction data;
    b) the first device generates a first signature by using the complete transaction data, a first algorithm and a first key;
    c) the first device modifies at least one character from the complete transaction data and gets partial transaction data;

d) the first device sends to the second device the partial transaction data;
e) the second device requests a user to modify the partial transaction data by providing at least one character, as complementary data to the partial transaction data;
f) the second device gets, as a request response from the user, at least one character to modify the partial transaction data, a corresponding result being proposed modified transaction data;
g) the second device generates a second signature by using the proposed modified transaction data, the first algorithm and the first key;
h) the second device sends to the first device the second signature;
i) the first device verifies whether the second signature does or does not match the first signature; and
j) only if the second signature does match the first signature, the first device authorizes to carry out a corresponding transaction.

2. Method according to claim 1, wherein the step d), in which the first device sends to the second device the partial transaction data, is replaced by the following steps:
   d1) the first device generates a code based upon the partial transaction data;
   d2) the first device sends to the second device the code; and
   d3) the second device decodes the code and gets the partial transaction data.

3. Method according to claim 2, wherein, a third device being an intermediary device between the first and the second device, the method comprises, instead of the steps d2) to g), in which:
   d2) the first device sends to the second device the code;
   d3) the second device decodes the code and gets the partial transaction data;
   e) the second device requests a user to modify the partial transaction data by providing at least one character, as complementary data to the partial transaction data;
   f) the second device gets, as a request response from the user, at least one character to modify the partial transaction data, a corresponding result being proposed modified transaction data;
   g) the second device generates a second signature by using the proposed modified transaction data, the first algorithm and the first key,
   the method comprises the following steps:
   d2') the first device sends to the third device the code;
   d3') the third device gets and decodes the code and gets the partial transaction data;
   e') the third device requests a user to modify the partial transaction data by providing at least one character, as complementary data to the partial transaction data;
   f') the third device gets, as a request response from the user, at least one character to modify the partial transaction data, a corresponding result being proposed modified transaction data; and
   g') the third device generates a second signature by using the proposed modified transaction data, the first algorithm and the first key, and the second device gets the second signature.

4. Method according to claim 1, wherein the complete transaction data includes at least one element comprised within a group comprising:
   user data;
   a reference number;
   a bank account number relating to a sender;
   a bank account number relating to a recipient; and
   a transaction amount.

5. Method according to claim 2, wherein the first algorithm includes at least one element comprised within a group comprising:
   an RSA type algorithm;
   a DES type algorithm;
   a 3DES type algorithm;
   an HMAC SHA-1 type algorithm;
   an HMAC SHA 256 type algorithm; and
   an HMAC SHA 512 type algorithm.

6. Method according to claim 2, wherein the code includes at least one element comprised within a group comprising:
   a Quick Response code;
   a barcode; and
   a bocode.

7. Method according to claim 1, wherein if the second signature does not match the first signature, then the first device either forbids to carry out a corresponding transaction or implements a risk management mechanism.

8. A first device for accessing a service, wherein the first device is configured to:
   receive data relating to a transaction, as complete transaction data;
   generate a first signature by using the complete transaction data, a first algorithm and a first key;
   modify at least one character from the complete transaction data and to get partial transaction data;
   send the partial transaction data;
   receive a second signature;
   verify whether the second signature does or does not match the first signature; and
   authorize to carry out a corresponding transaction only if the second signature matches the first signature.

9. A second device for accessing a service, wherein the second device is configured to:
   send data relating to a transaction, as complete transaction data;
   receive partial transaction data;
   request a user to modify the partial transaction data by providing at least one character, as complementary data to the partial transaction data;
   get, as a request response from the user, at least one character to modify the partial transaction data, a corresponding result being proposed modified transaction data;
   generate a second signature by using the proposed modified transaction data, a first algorithm and a first key; and
   send the second signature.

10. A system for accessing a service, wherein the system comprises:
    a first device, and
    at least one second device, the second device being connected or coupled to the first device,
    wherein the first device is configured to:
      receive data relating to a transaction, as complete transaction data;
      generate a first signature by using the complete transaction data, a first algorithm and a first key;
      modify at least one character from the complete transaction data and to get partial transaction data;
      send the partial transaction data;
      receive a second signature;
      verify whether the second signature does or does not match the first signature; and authorize to carry out a corresponding transaction only if the second signature matches the first signature; and wherein the second device is configured to:
send data relating to a transaction, as complete transaction data;
receive partial transaction data;
request a user to modify the partial transaction data by providing at least one character, as complementary data to the partial transaction data;
get, as a request response from the user, at least one character to modify the partial transaction data, a corresponding result being proposed modified transaction data;
generate a second signature by using the proposed modified transaction data, a first algorithm and a first key; and
send the second signature.

\* \* \* \* \*